United States Patent
Godfrey et al.

(10) Patent No.: US 9,429,023 B2
(45) Date of Patent: Aug. 30, 2016

(54) GAS TURBINE ENGINE COMPONENTS AND METHODS FOR THEIR MANUFACTURE USING ADDITIVE MANUFACTURING TECHNIQUES

(71) Applicant: HONEYWELL INTERNATIONAL INC., Morristown, NJ (US)

(72) Inventors: Donald G. Godfrey, Phoenix, AZ (US); Mark C. Morris, Phoenix, AZ (US); Andy Szuromi, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 862 days.

(21) Appl. No.: 13/740,422

(22) Filed: Jan. 14, 2013

(65) Prior Publication Data

US 2014/0199175 A1 Jul. 17, 2014

(51) Int. Cl.
*F01D 5/14* (2006.01)
*B22F 3/105* (2006.01)
*B22F 5/00* (2006.01)
*B22F 5/04* (2006.01)

(52) U.S. Cl.
CPC ............... *F01D 5/14* (2013.01); *B22F 3/1055* (2013.01); *B22F 5/009* (2013.01); *B22F 5/04* (2013.01); *Y02P 10/295* (2015.11); *Y10T 29/49316* (2015.01)

(58) Field of Classification Search
CPC .................................. F01D 5/14; F01D 5/147
USPC .................................. 416/241 R, 241, 241 B
See application file for complete search history.

(56) References Cited

U.S. PATENT DOCUMENTS

| | | | | |
|---|---|---|---|---|
| 5,451,142 A * | 9/1995 | Cetel | .......................... | C23C 4/00 415/200 |
| 6,902,376 B2 * | 6/2005 | Gautreau | .................. | F01D 5/16 416/219 R |
| 7,754,126 B2 * | 7/2010 | Subramanian | ........ | C04B 35/573 264/258 |
| 8,021,742 B2 * | 9/2011 | Anoshkina | .............. | C23C 30/00 416/241 B |
| 2004/0056022 A1 | 3/2004 | Meiners et al. | | |
| 2006/0051212 A1 * | 3/2006 | O'Brien | ..................... | F01D 5/28 416/241 R |
| 2006/0073019 A1 * | 4/2006 | Wettstein | .................. | F01D 5/20 416/203 |
| 2006/0134454 A1 * | 6/2006 | Sathian | ................. | B22F 1/0003 428/668 |
| 2007/0033980 A1 | 2/2007 | Nishimura | | |
| 2010/0247740 A1 * | 9/2010 | Reitz | ....................... | C23C 24/00 427/8 |
| 2011/0311389 A1 | 12/2011 | Ryan et al. | | |

OTHER PUBLICATIONS

Alexander H. Nickel "Analysis of Thermal Stresses in Shape Deposition Manufacturing of Metal Parts" A Dissertation Submitted to The Department of Materials Science and Engineering and the Committee on Graduate Studies of Stanford University in Partial Fulfillment of the Requirements for the Degree of Doctor of Philosophy, Oct. 1999; http://npl-web.stanford.edu/user/files/papers/thesis_anickel.pdf.

Krol, T. A., et al.: "Optimization of Supports in Metal-Based Additive Manufacturing by Means of Finite Element Models" http://utwired.engr.utexas.edu/lff/symposium/proceedingsArchive/pubs/Manuscripts/2012/2012-53-Krol.pdf.

Nickel, A., et al.: "Residual Stresses in Layered Manufacturing" Solid Freeform Fabrication Symposium, Austin, Texas, 1999.

\* cited by examiner

*Primary Examiner* — Nathaniel Wiehe
*Assistant Examiner* — Woody Lee, Jr.
(74) *Attorney, Agent, or Firm* — Ingrassia, Fisher & Lorenz, P.C.

(57) ABSTRACT

In accordance with an exemplary embodiment, a method for manufacturing a component using additive manufacturing techniques includes providing a 3D design model for the component, adding one or more crack resistant features to the 3D design model of the component to produce an enhanced design model, and manufacturing the component using an additive manufacturing technique in accordance with the enhanced design model. The one or more crack resistant features are provided to reduce or eliminate the incidence of cracking in the manufactured component.

13 Claims, 5 Drawing Sheets

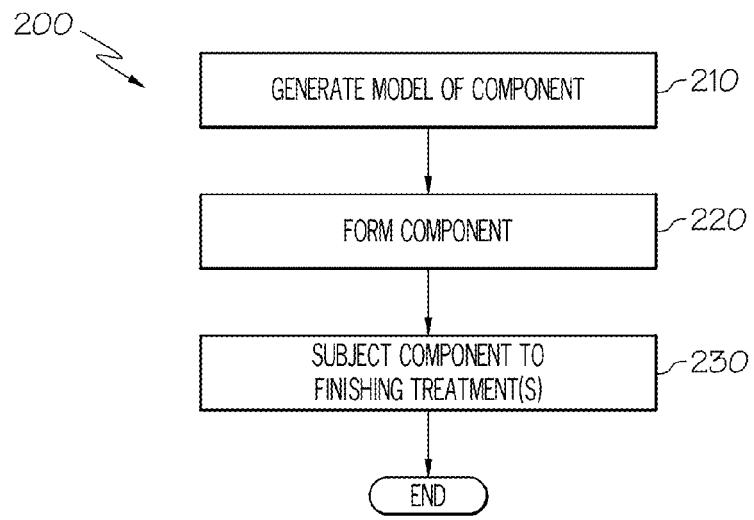
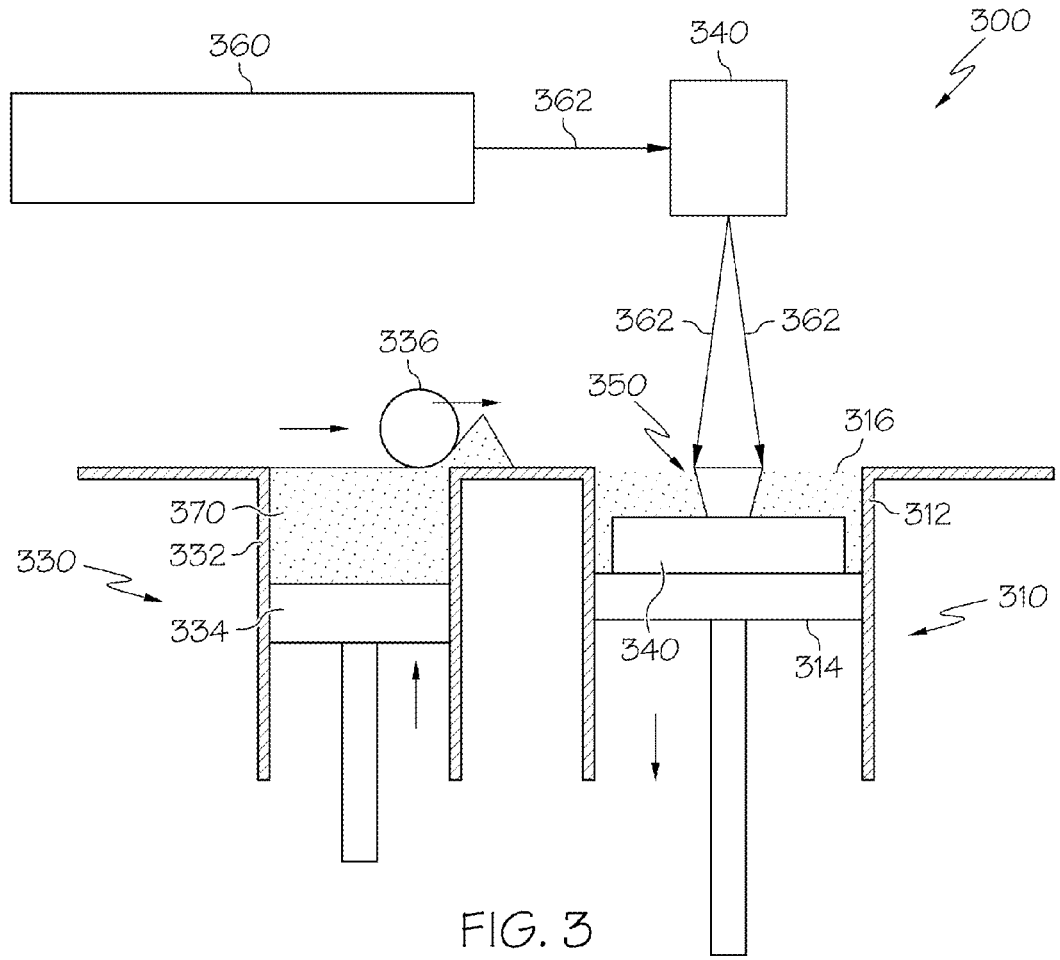

GAS TURBINE ENGINE COMPONENTS AND METHODS FOR THEIR MANUFACTURE USING ADDITIVE MANUFACTURING TECHNIQUES

TECHNICAL FIELD

An embodiment of the present disclosure generally relates to gas turbine engines, and more particularly relates to improved methods of manufacturing components for use in gas turbine engines.

BACKGROUND

A gas turbine engine may be used to power aircraft or various other types of vehicles and systems. The engine typically includes a compressor that receives and compresses an incoming gas such as air; a combustion chamber in which the compressed gas is mixed with fuel and burned to produce exhaust gas; and one or more turbines that extract energy from the high-pressure, high-velocity exhaust gas exiting the combustion chamber.

In the manufacture of gas turbine engines, and in particular in engine development programs, the date at which the first engine can be tested is limited by the long schedule required to fabricate the cooled turbine parts such as blades and vanes. For example, cooled turbine airfoils are typically one of the "critical path" components in gas turbine engine fabrication, the completion of which is required prior to any engine testing. Due to the expensive tooling and fabrication costs for these components, limited quantities of hardware are purchased for development programs.

Recently, additive manufacturing methods have emerged, including for example the use of direct metal laser sintering/fusion (DMLS)/(DMLF), selective laser sintering (SLS), and electron beam melting (EBM), to eliminate the need for tooling, which is expected to result in significant cost and cycle time reduction in the manufacture of gas turbine engines. However, the high temperature, high strength nickel based super alloy materials currently employed in such additive manufacturing methods have a tendency to crack after build, rendering the component unusable for engine testing.

EBM uses an electron beam and DMLF uses a laser to solidify a metal powder. Parts are built in small layers (a few mils) in additive steps to produce a completed part. Fine powdered alloys are sintered and melted into a final part. The mechanics of the DMLF and EBM build processes are similar, except for the fact that the DMLF process uses a laser and the EBM process utilizes an electron beam. Both energy sources melt fine layers of powder and fuse that layer to the subsequent layer directly below it.

With both DMLF and EBM technologies, it is desirable to eliminate cracking during build and during post build processes. Using current DMLF technology, the process does not maintain acceptable thermal gradients in the part during build. The resulting thermal gradients induce thermal stresses that may produce cracking during build and post build processing. Similarly, EBM technology may produce a homogenous component, but there is a still a tendency for cracking.

Accordingly, it is desirable to provide improved additive manufacturing techniques that reduce the tendency of the completed part to crack post-build. Further, it is desirable to provide components for use in gas turbine engines quickly and efficiently such that the design-to-test time for the gas turbine engine is reduced. Furthermore, other desirable features and characteristics of the invention will become apparent from the subsequent detailed description and the appended claims, taken in conjunction with the accompanying drawings and this background of the invention.

BRIEF SUMMARY

In accordance with an exemplary embodiment, a method for manufacturing a component using additive manufacturing techniques includes providing a 3D design model for the component, adding one or more crack resistant features to the 3D design model of the component to produce an enhanced design model, and manufacturing the component using an additive manufacturing technique in accordance with the enhanced design model. The one or more crack resistant features are provided to reduce or eliminate the incidence of cracking in the manufactured component.

In accordance with another exemplary embodiment, a gas turbine engine component manufactured using an additive manufacturing technique includes an airfoil portion and a base portion. The base portion includes one or more crack resistant features. The one or more crack resistant features are provided to reduce or eliminate the incidence of cracking in the manufactured gas turbine engine component.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein:

FIG. 2 is a flow diagram illustrating steps in a method of manufacturing a gas turbine engine component in accordance with an embodiment of the present disclosure;

FIG. 3 is an exemplary additive manufacturing system suitable for use in manufacturing gas turbine engine components in accordance with an embodiment of the present disclosure;

DETAILED DESCRIPTION

Figure 1:
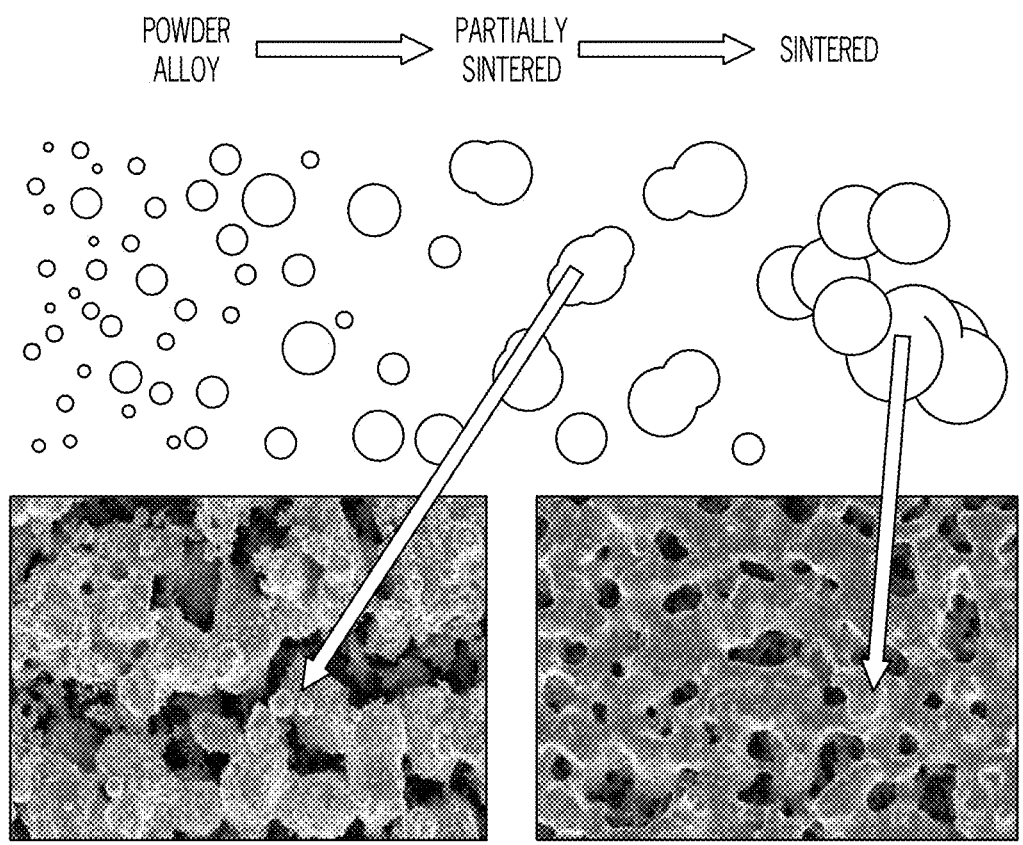
FIG. 1 illustrates internal and surface micro-cracking or cracking in a gas turbine engine component manufactured using DMLS.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the gas turbine engine components and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Further, although certain embodiments described herein provide improved methods for manufacturing gas turbine engine components, and in particular the cooled components thereof such as turbine blades and vanes, it will be appreciated that the methods described herein will be useful in any number of applications wherein additive manufacturing techniques are employed. In particular, the methods described herein may find application in any of various implementations where it is desirable to decrease the production time of components parts using additive manufacturing techniques.

Disclosed herein is an improved method for manufacturing gas turbine engine components using a free-form manufacturing process for its production. Embodiments of the present disclosure utilize a manufacturing process that incorporates a low energy density laser beam, referred to as "direct metal laser fusion" (DMLF), or a low energy electron beam, referred to as "electron beam melting" (EBM), in a powder tank. These "free-form" or "additive manufacturing" (AM) processes use a small, focused beam to build a component by fusing or melting one layer of powder to the fused or melted layer of powder directly beneath it. The additive manufacturing methods disclosed herein utilize DMLF/EBM to build unique designs that are not practical and/or possible with prior technologies such as spring coiling machines or casting, where costly and time-consuming tooling is required.

In general, it is expected that, based on the teachings herein, a person having ordinary skill in the art will be able to design a component part, such as for use in a gas turbine engine, to conform for use in a wide variety of applications, as the selection of size, shape, etc. of working components is generally considered to be within the level of skill of a person having ordinary skill in the art. As such, the various possible implementations and uses of the improved methods described herein should not be considered limited to any of the embodiments presented herein.

Embodiments of the present disclosure provide an enabling technology that mitigates the residual stress and resulting cracking associated with additive manufacturing technology. The described approach provides engine capable hardware to reduce development cycle time and cost for prototype or production programs. The described approach generally provides engine capable hardware during normal production operations. DMLF process trials on nickel based super alloy materials have been known to result in significant residual stress which contributes to internal and surface micro-cracking or cracking. Internal porosity may also be present, as shown in FIG. 1, which may act as undesirable crack initiators. The industry is thus limited when using additive manufacturing technologies, particularly when using high temperature, high strength nickel based super alloys with thick-to-thin geometric transitions as are commonly found in gas turbine engine components, such as cooled turbine blades and vanes. As an improvement to the state of the art, embodiments of the present disclosure provide, in combination with encapsulation and HIP after additive manufacturing, a turbine component that is substantially porosity and crack-free and capable of operating in an engine environment.

Greater detail regarding the additive manufacturing techniques noted above will now be provided, again with reference to the exemplary gas turbine engine components. It will be appreciated that certain features of the presently described gas turbine engine components would be prohibitively expensive to manufacture using conventional manufacturing techniques. Using additive manufacturing techniques, however, or other recently developed manufacturing techniques, component parts can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base super-alloy materials.

FIG. 2 is a flowchart illustrating a method 200 for manufacturing a gas turbine engine component in accordance with an exemplary embodiment using, in whole or in part, additive manufacturing techniques. In a first step 210, a model, such as a design model, of the gas turbine engine component may be defined in any suitable manner. For example, the model may be designed with computer aided design (CAD) software and may include three-dimensional ("3D") numeric coordinates of the entire configuration of the gas turbine engine component including both external and internal surfaces. In one exemplary embodiment, the model may include a number of successive two-dimensional ("2D") cross-sectional slices that together form the 3D component.

This design phase step 210 is performed in the following manner. During the design phase, 3D structural analyses are employed to generate an optimal design for a particular implementation, for example the cross-sectional area(s) and the material(s) used in the manufacture of the gas turbine engine component for optimal life. The configuration is then analyzed with 3D stress/deflection analyses to optimize the mechanical fatigue life of the component. The resulting configuration is enabled without the prior art requirements of brazing/welding. The component is fabricated as a single, integral unit.

In step 220 of the method 200, the gas turbine engine component is formed according to the model of step 210. In one exemplary embodiment, a portion of the gas turbine engine component is formed using a rapid prototyping or additive layer manufacturing process. In other embodiments, the entire gas turbine engine component is formed using a rapid prototyping or additive layer manufacturing process. Although additive layer manufacturing processes are described in greater detail below, in still other alternative embodiments, portions of the gas turbine engine component may be forged or cast in step 220, for example, with a single-crystal structure.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the gas turbine engine component in step 220. DMLF is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 220 is performed with DMLF techniques to form the gas turbine engine component. However, prior to a discussion of the subsequent method steps, reference is made to FIG. 3, which is a schematic view of a DMLF system 300 for manufacturing the gas turbine engine component, for example one or more cooled turbine blades or vanes, in accordance with an exemplary embodiment.

Referring to FIG. 3, the system 300 includes a fabrication device 310, a powder delivery device 330, a scanner 340, and a laser 360 that function to manufacture the article 350 (e.g., the gas turbine engine component) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a base block 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 340 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

Upon completion of a respective layer, the fabrication support 314 is lowered and the delivery support 334 is raised. Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer.

As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the gas turbine engine component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. As a general matter, the build material 370 may be formed by any suitable powder, including powdered metals, such as a stainless steel powder, and alloys and super alloy materials, such as nickel-based or cobalt superalloys. In one exemplary embodiment, the build material 370 is a high temperature nickel base super alloy such as IN718. In other embodiments, MAR-M-247, IN738, titanium, aluminum, titanium-aluminide, or other suitable alloys may be employed. In general, the powder build material 370 may be selected for enhanced strength, durability, and useful life, particularly at high temperatures, although as described below, the powder build material 370 may also be selected based on the intended function of the area being formed.

Returning to FIG. 2, at the completion of step 220, the article, i.e., the gas turbine engine component, is removed from the additive manufacturing system (e.g., from the DMLF system 300). In optional step 230, the gas turbine engine component formed in step 220 may undergo finishing treatments. Finishing treatments may include, for example, aging, annealing, quenching, peening, polishing, hot isostatic pressing (HIP), or coatings. In addition, finishing treatments may include removal of any thermal attenuation structures, cantilevered wings, or crack arrestor holes that are not desired in the final component. If necessary, the gas turbine engine component may be machined to final specifications. As noted above, one example of a post-laser fusion process of step 230 is a HIP process in which an encapsulation layer is applied and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS," and published as U.S. Patent Application Publication No. 2011/0311389. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

The very nature of sintering (fusing) high temperature, high strength nickel base super alloy metal powders into a component can result in significant residual stresses that may induce cracking as the fine powder fuses together into larger polycrystalline structures, as shown in FIG. 1. To eliminate internal porosity and cracking, the prior art utilizes a HIP processing cycle after the DMLF fabrication, as described above. However, it is well known to those skilled in the art that the HIP process will not reduce surface porosity, surface cracks, or any internal porosity or cracks that are connected to the surface of the component. Thus, for high performance parts produced with nickel based super alloy materials, the resulting component built via additive manufacturing will have a high propensity to crack during post build processes. Residual stresses built into the part may be concentrated during these high temperatures post build processes, resulting in cracking.

Figure 4A:
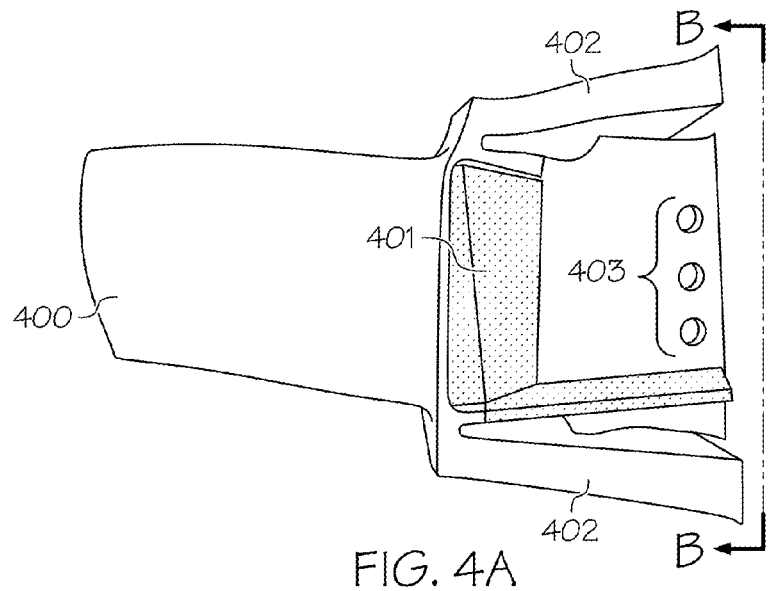
FIGS. 4A-4C illustrate views of an exemplary turbine blade structure including various crack resistant features.
Figure 4B:
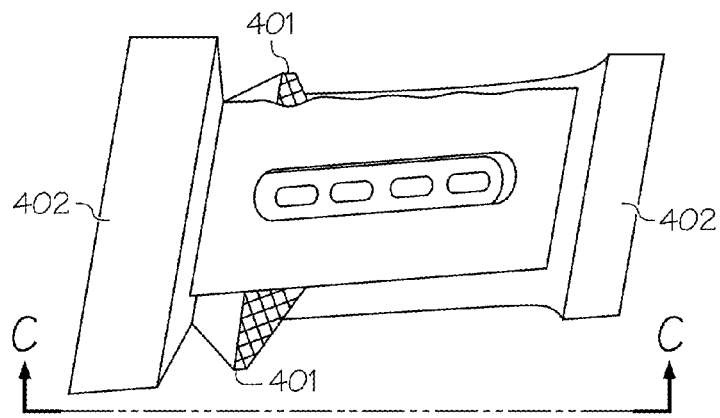
Figure 4C:
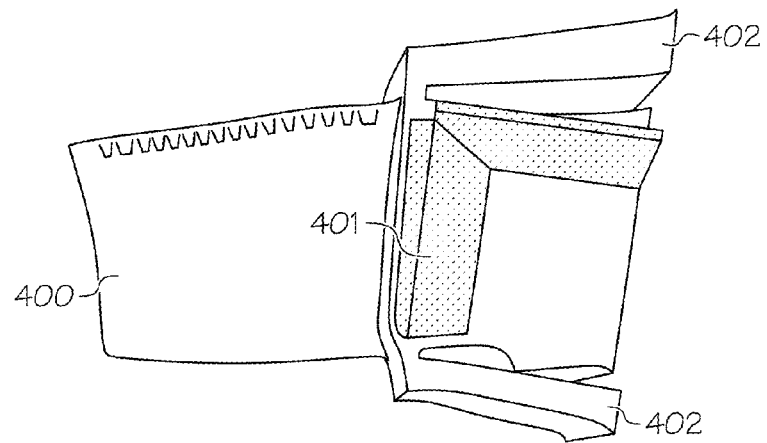
Figure 5A:
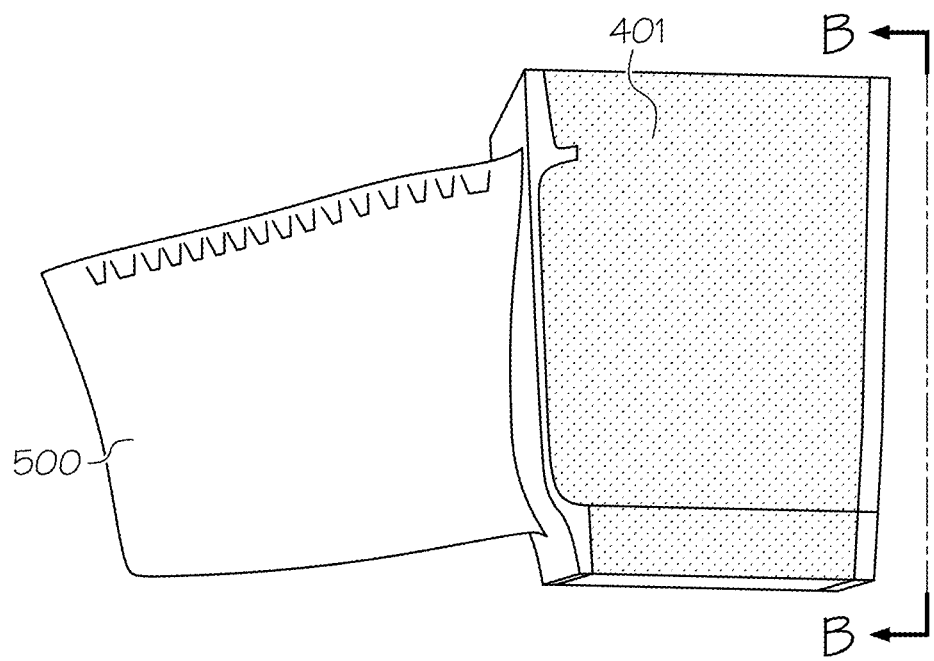
FIGS. 5A-5B illustrate views of another exemplary turbine blade structure including various crack resistant features.
Figure 5B:
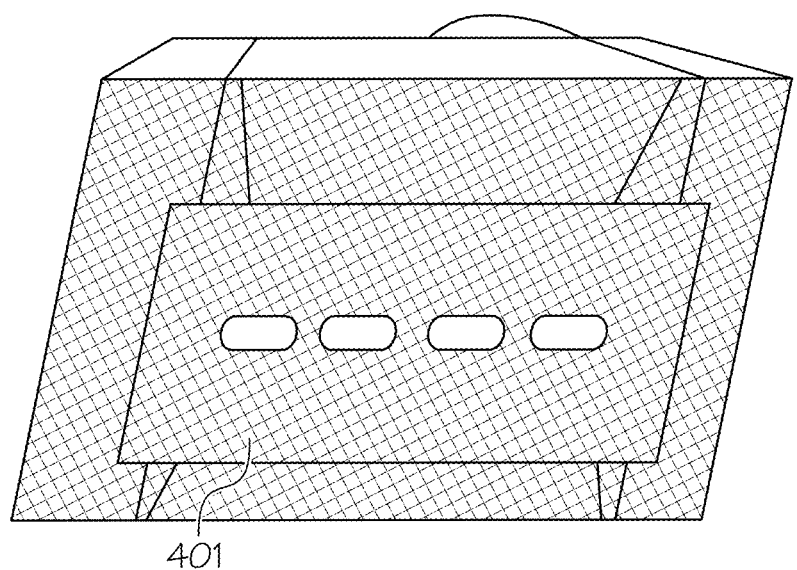
Figure 6A:
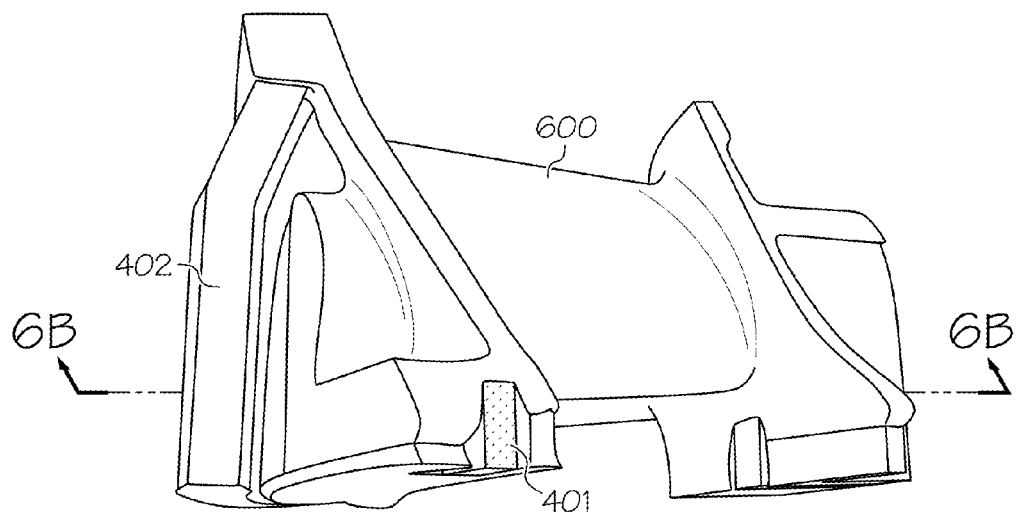
FIGS. 6A-6B illustrate views of an exemplary turbine vane structure including various crack resistant features.
Figure 6B:
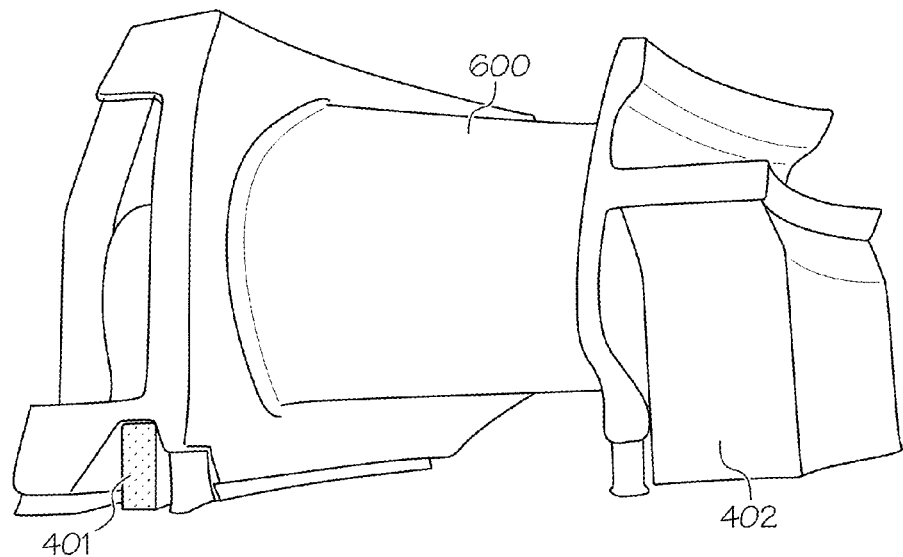

Exemplary embodiments of the present disclosure overcome the deficiency in the prior art by introducing the addition of one or more crack resistant features. That is, the gas turbine engine component is designed (as in step 210, above) to include one or more crack resistant features. As used herein, the term crack resistant feature refers to a design feature on the gas turbine engine component that is included to resist the formation of cracks in the manufactured component when AM techniques are employed. Examples of crack resistant features include, but are not limited to: cantilevered "wings" for stress/load-path isolation; thermal attenuation structures to provide structural support while simultaneously reducing heat loss to surrounding regions; and crack arrestors that allow either a path for stresses to move to or a target for stresses to move to and then are captured and prevented from moving further along the component surface. Each such crack resistant feature will be described in greater detail below with reference to FIGS. 4A-4C, 5A-5B, and 6A-6B. In particular, FIGS. 4A-4C depict a gas turbine engine blade 400 including a plurality of crack resistant features, FIGS. 5A-5B depict another gas turbine engine blade 500 include a plurality of crack resistant features, and FIGS. 6A-6B depict a gas turbine engine vane 600 including a plurality of crack resistant features. Again, as noted above, these crack resistant features are added to the design of the turbine engine component (400, 500, 600, etc.), and then are typically machined-off of such component after fabrication and prior to installation in a gas turbine engine.

First, reference is made to the thermal attenuation structures. Various thermal attenuation structures 401, shown in all of FIGS. 4A-4C, 5A-5B, and 6A-6B, are utilized to provide structural support while simultaneously reducing heat loss to surrounding regions. The thermal attenuation structures 401 are preferably employed as variously sized and shaped "honeycomb" and "lattice" structures, as depicted in the Figures. These structures 401 have shown to be successful in reducing thermal gradients and in providing support between vertical to horizontal transitioning regions, including thick-to-thin transitions. Such structures 401 can generally be included on any portion of the blade or vane, and preferably are included above and/or below the airfoil portion of the manufactured blade or vane on a base portion thereof as shown in the Figures, such as the blade attachment regions.

Second, reference is made to the cantilevered "wings." Exemplary cantilevered wings 402, shown in FIGS. 4A-4C and 6A-6B, enable additive manufacturing of cantilevered geometries to support the building of cantilevered geometries. The wings 402 enable component building in the powder bed, reduce stresses induced as a result of the build, and attenuate stress concentrations that occur during post build processing by providing stress/load-path isolation. The wings 402 are particularly effective at thick-to-thin transition regions where thermal gradients and thermal capacitance mismatches result in high residual stresses in the component build. The wings 402 can generally be included on any portion of the blade or vane, and preferable are include on sides of the component above and/or below the airfoil portion of the manufactured blade or vane on a base portion thereof as shown in the Figures, such as the blade attachment regions. The thermal attenuation structures 401 and cantilevered wings 402 may be placed in regions of build that will be subsequently machined off, resulting in a substantially crack/defect free component.

Third, reference is made to the crack arrestor holes. Exemplary crack arrestor holes 403, shown in FIG. 4A, may be round or oval, with full fillets, and act to concentrate the stresses during post-build processing and funnel the stresses into the arrestor holes 403. Once captured in a hole, the smooth curvature and full filleting of the arrestor holes acts to stop crack propagation. The holes 403 are placed in regions of build that will be subsequently machined off, resulting in a substantially crack/defect free component. Arrestor holes 403 have been particularly effective in blade attachment regions. The crack arrestors can be applied in areas on the part geometry that are best for containing surface cracks.

Upon completion of part build, as noted above, the gas turbine engine component is subjected to post-build processing, such as encapsulation, stress relieve, HIP, and thermal processes, which eliminate the porosity and microcracking from the component. Subsequent solutioning and aging heat treatments of the component provide acceptable microstructure for use in gas turbine engine applications.

Accordingly, the exemplary embodiments described herein provide improved additive manufacturing techniques that reduce the tendency of the completed part to crack post-build. Further, the exemplary embodiments described herein provide components for use in gas turbine engines quickly and efficiently such that the design-to-test time for the gas turbine engine is reduced.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for manufacturing a metallic superalloy gas turbine engine component using additive manufacturing techniques, the method comprising the steps of:
   providing a 3D design model for the gas turbine engine component, the 3D design model comprising an airfoil portion and a base portion, wherein the base portion comprises an attachment surface to which the airfoil portion is attached;

adding at least two crack resistant features to the 3D design model of the component to produce an enhanced design model, wherein the at least two crack resistant features are selected from two or more of the group consisting of:
- (a) a buttress having a first end and a second end, wherein the first end is connected to and metallurgically integral with the base portion, and wherein the second end is disconnected from the base portion,
- (b) a lattice structure that is connected to and metallurgically integral with the base portion, said lattice structure extending along one or more surfaces of the base portion, and
- (c) one or more holes that extend entirely through the base portion in a direction substantially parallel with the attachment surface; and manufacturing the gas turbine engine component using an additive manufacturing technique in accordance with the enhanced design model to form a manufactured gas turbine engine component, wherein the at least two crack resistant features are provided to reduce or eliminate the incidence of cracking in the manufactured gas turbine engine component.

2. The method of claim 1, wherein the additive manufacturing technique is direct metal laser fusion.

3. The method of claim 1, wherein the additive manufacturing technique is electron beam melting.

4. The method of claim 1, wherein the gas turbine engine component is a turbine blade.

5. The method of claim 1, wherein the gas turbine engine component is a turbine vane.

6. The method of claim 1, further comprising removing at least one of the at least two crack resistant features from the manufactured gas turbine engine component.

7. A metallic superalloy gas turbine engine component manufactured using an additive manufacturing technique comprising:

an airfoil portion; and a base portion having an attachment surface to which the airfoil portion is attached, wherein the base portion comprises at least two crack resistant features, the at least two crack resistant features being configured to reduce or eliminate the incidence of cracking in the manufactured gas turbine engine component, wherein the at least two crack resistant features are selected from two or more of the group consisting of:
- (a) a buttress having a first end and a second end, wherein the first end is connected to and metallurgically integral with the base portion, and wherein the second end is disconnected from the base portion,
- (b) a lattice structure that is connected to and metallurgically integral with the base portion, said lattice structure extending along one or more surfaces of the base portion, and
- (c) one or more holes that extend entirely through the base portion in a direction substantially parallel with the attachment surface.

8. The metallic superalloy gas turbine engine component of claim 7, wherein the additive manufacturing technique is direct metal laser fusion.

9. The metallic superalloy gas turbine engine component of claim 7, wherein the additive manufacturing technique is electron beam melting.

10. The metallic superalloy gas turbine engine component of claim 7, wherein the gas turbine engine component is a turbine blade.

11. The metallic superalloy gas turbine engine component of claim 7, wherein the gas turbine engine component is a turbine vane.

12. A gas turbine engine comprising a metallic superalloy gas turbine engine component as defined by claim 7.

13. The metallic superalloy gas turbine engine component of claim 7 comprising each of the crack resistant features (a), (b) and (c).

* * * * *